US005789879A

United States Patent [19]

Cook

[11] Patent Number: 5,789,879

[45] Date of Patent: Aug. 4, 1998

[54] MULTIPLE PUMP HYDRAULIC POWER SYSTEM

[76] Inventor: Noel R. Cook, 4481 W. Cherry Hill Dr., Occhard Lake, Mich. 48323

[21] Appl. No.: 552,375

[22] Filed: Nov. 3, 1995

[51] Int. Cl.$^{6}$ .............................. H02P 1/54; F04B 41/06

[52] U.S. Cl. .............................. 318/101; 318/103; 417/4; 417/44.2

[58] Field of Search .............................. 318/49.5, 67, 98, 318/99, 101–103, 4, 5, 8; 417/1–8, 14, 20, 21, 32, 29–31, 44.1–44.4, 321, 366, 367; 340/606, 607, 611, 622

[56] References Cited

U.S. PATENT DOCUMENTS

| | | | |
|---|---|---|---|
| 4,341,983 | 7/1982 | Gottliebson | 318/102 |
| 4,451,773 | 5/1984 | Papathomas et al. | 320/59 |
| 4,500,874 | 2/1985 | Jacobi et al. | 340/607 |
| 4,502,842 | 3/1985 | Currier et al. | 417/8 |
| 5,095,709 | 3/1992 | Billiot | 62/50.3 |
| 5,422,550 | 6/1995 | McClanahan et al. | 318/91 |
| 5,522,707 | 6/1996 | Potter | 417/4 |
| 5,566,709 | 10/1996 | Fujii et al. | 137/487.5 |

*Primary Examiner*—Brian Sircus
*Attorney, Agent, or Firm*—James H. Bower

[57] ABSTRACT

A multiple electric motor hydraulic oil pump power system including a programmable controller having electric motor starting and stopping circuitry for hydraulic oil flow control. The circuitry having means to compare each electric motor running hours and select the motor with the least running hours to adjust oil flow to the desired amount. The system monitors oil pressure and flow, comparing such pressure and flow with the desired value and automatically adjusting the system to accomplish the correction. The controller also maintains safety sensing devices for high and low oil reservoir levels, oil filter condition limits, oil temperature limits, and means to maintain a constant oil pressure under load with load flow rates varying from very low to very high.

2 Claims, 1 Drawing Sheet

MULTIPLE PUMP HYDRAULIC POWER SYSTEM

SUMMARY OF THE INVENTION

This invention relates to apparatus and method for manually or automatically controlling the operation of a multiple electric motor driven hydraulic pump system, and more particularly, to systems controlling the starting and stopping of multiple electric motors each associated with a hydraulic pump.

A main function in automatically controlling a plurality of motors is to start the motor in accord with the load demand, and to systematically stop the motors as the demand diminishes.

It is well known that the useful life of an electric motor diminishes as its operating time accumulates and the life is shortened by frequent starts without time between stops to permit cooling of the motor. It is therefore important to control the order of starting and stopping of a multiple motor system to prolong the life of each motor.

The present invention consists of a hydraulic power system having a variable number of hydraulic pumps driven by individual dedicated constant speed electric motors. The system may vary between a minimum of two to a maximum of twenty five motor/pump sets, however, in the drawings are shown three motor/pump sets as an example.

A primary object of the multiple pump hydraulic system is to efficiently supply any amount of oil flow at constant pressure with flow rates varying from a very low minimum to a very high maximum.

It is a further object to provide control of electric motor start to minimize starting current and monitor motor running hours and distribute normal motor life over the several motor/pump sets.

Another advantage of the invention is to monitor hydraulic oil low level conditions as well as high level conditions in the oil reservoir.

Also, monitor hydraulic oil filter cleanliness to signal need for filter element change.

Also, monitor oil temperature to prevent overheating of the hydraulic oil resulting in a system shut down.

A further object is to monitor the oil flow and pressure to the hydraulic load, and comparing this signal with the predetermined flow and pressure desired and making any correction by turning on or off pumps as required.

A further object is to turn pumps on or off by comparing the flow-pressure signal requirement with the oil level and temperature signal and motor hours signal.

Another advantage is to reduce the noise, vibration, and size of multiple electric motor driven high pressure hydraulic pump systems by use of integrated motor/pump sets.

DETAILED DESCRIPTION OF THE PREFERRED EMBODIMENT

Figure 1:
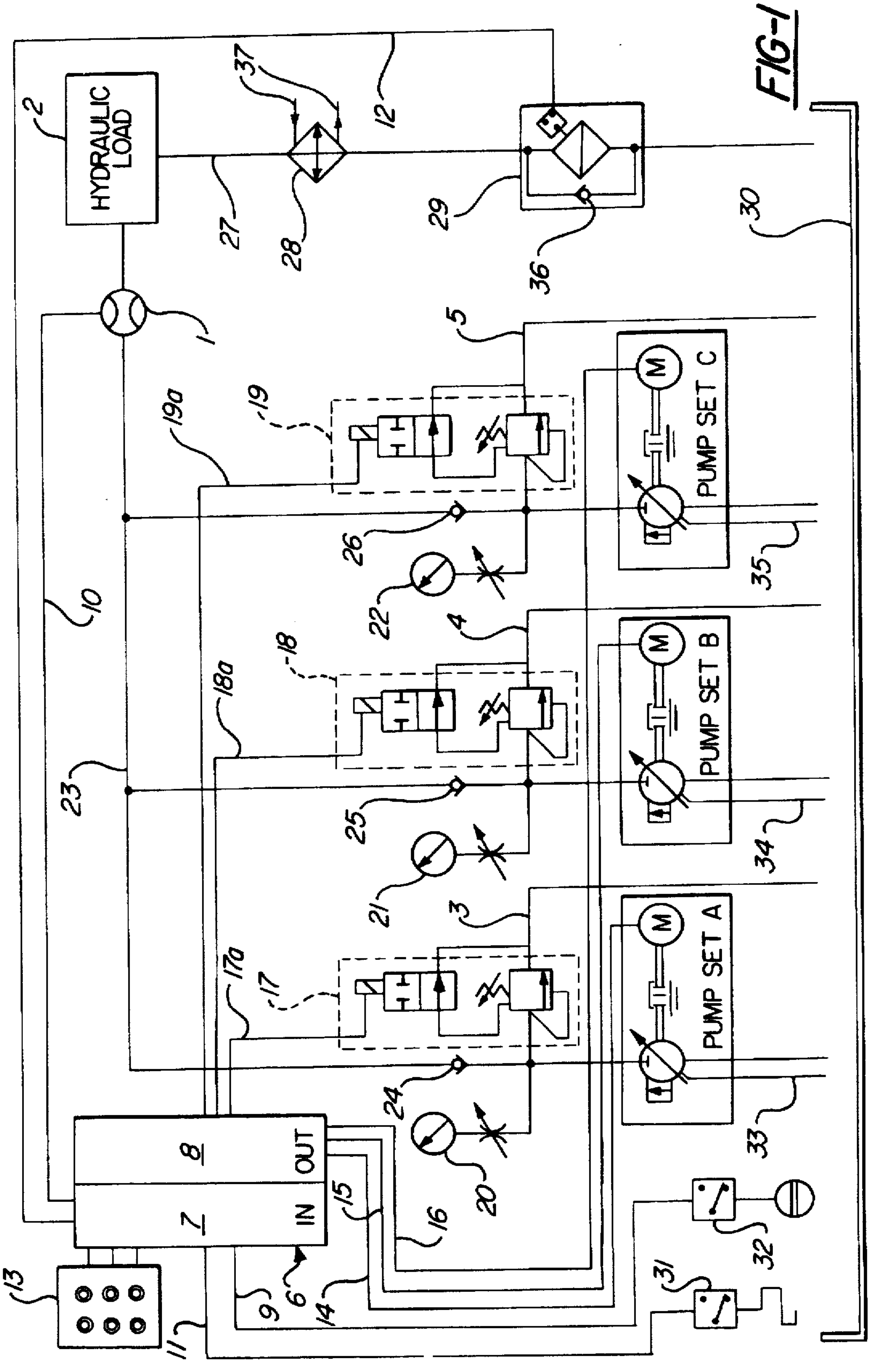
FIG. 1 is a simplified functional block diagram circuit of the programmable logic control (controller) embodying the signals in and out to control a hydraulic power system having three electric motor/pump sets. Also shown is the simplified hydraulic circuit.

Reference is made to FIG. 1, which is a functional diagram for controlling three motor/pump sets A, B, and C in a system to supply a varying amount of oil flow rates from very low to a very high maximum at a constant pressure. The flow rate is controlled by flow meter 1 prior to entering the hydraulic load 2.

The motor/pump sets A, B, and C are controlled by a programmable controller 6 that includes motor starting circuitry and motor stopping circuitry. The controller 6 also includes means to control motor starting current, motor running hours, and means to optimize continuity of oil pressure and flow as pumps are brought on line or shut down.

Also note in FIG. 1, the controller 6 has a signal "in" input side 7 and signal "out" output side 8.

The controller signal input 7 has oil level 9 signal, flow meter signal 10, oil temperature signal 11, and oil filter signal 12 receiving information from the hydraulic circuit. Also push button station 13 manually places signals to the input side 7 of controller 6 to run the hydraulic system in manual control.

The controller 6 "output" side 8 has motor signal 14 controlling motor/pump sets A, motor signal 15 controlling motor/pump set B and motor signal 16 controlling motor/pump set C.

Each motor/pump set A, B and C has a solenoid operated relief valve 17, 18 and 19 and control signal lines 17*a*, 18*a*, and 19*a* respectively and oil pressure gage 20, 21, and 22, respectively.

The hydraulic oil flow from each motor/pump set enters flow output line 23 after passing through their respective pump isolation check valve 24, 25 and 26.

After the oil flow passed through hydraulic load 2, it is cooled by entering reservoir tank line 27 and entering heat exchanger 28 having cooling lines 37. The oil flow is then cleaned by passing through filter 29 having by pass check valve 36 and returned to oil reservoir 30.

Oil reservoir 30 has temperature switch 31 and oil low level switch 32.

Also entering the oil reservoir 30 is the pump case drain oil line 33, 34 and 35 from each pump housing A, B and C respectively. Oil flowing from the pressure side of the pump to the pump case provides oil for pump cooling and lubrication.

The controller 6 has circuitry to automatically supply controlled flow and pressure for the system. The motor/pump sets A, B and C automatically turn on and off as determined by the controller logic circuit which monitor flow requirements. Solenoid relief valves 17, 18 and 19 vent or close by solenoid actuation. For pump flow to operate at full system pressure which is normally 3000 psig (Pounds per square inch gage) the solenoid operated relief valve is closed. When the pump flows to vent lines 3, 4, or 5 to reservoir 30 at minimal pressure, the solenoid relief valve is open.

When a motor/pump A, B or C is started, there is a five second sequence delay to allow the motor to reach synchronous speed under vent no load conditions before the solenoid relief valve 17, 18 or 19 associated with the pump is actuated closed to obtain the pressure of 3000 psig. Once the solenoid relief valve is actuated, controlling oil flow at 3000 psig, a second motor/pump is started with solenoid vented relief on standby to allow for quicker system response and which also lowers the electric power maximum demand. The solenoid 17, 18 and 19 vented relief lines are line 3, 4, and 5, respectively to reservoir tank 30.

As the hydraulic load 2 oil flow increases, flow meter 1 senses the increase and actuates the second motor/pump solenoid relief valve to bring the second motor/pump to system pressure. At this time the third motor/pump turns on under the vented relief condition for standby.

The changes in flow requirements at the hydraulic load 2 are sensed by turbine flow meter 1 which produces a number of electric pulses per gallon of liquid flow and provides the controller information to form the logic to make a flow correction by considering a waiting pump with the lowest hours and considering the flow demand requirement, making a decision on the proper motor sequence for the correction.

As the hydraulic load 2 oil flow decreases, the controller sequences off a motor/pump set in order of highest motor usage and the solenoid relief valve to vent that is associated with such motor/pump set.

In the preferred embodiment, the motor/pump sets A, B, and C are each an integrated combination of an electric motor and high pressure pump. Each pump is mounted directly to the motor as a self contained pod containing no electric motor cooling fan. Each motor/pump set is cooled by the hydraulic fluid, which is drawn from the oil reservoir through the motor and then to the pump, cooling the motor more efficiently than an air stream and in turn reducing motor noise, vibration, and size of the system.

Only certain preferred embodiments of this invention have been described and it is intended herein to cover all modifications as fall within the scope of this invention.

I claim:

1. A method for maintaining constant, load demand pressure with varying oil flow rates in a hydraulic power system having a plurality of electric synchronous speed motor/pump sets started and stopped by a programmable controller, the method comprising the steps of said controller starting said motor/pump sets, monitoring said oil flow rates by means of a single flow meter sensing said flow rate comparing said oil flow rate with flow load demand pressure, and stopping or starting said motor/pump sets to maintain load demand pressure.

2. The method of claim 1 comprising cooling said motor/pump sets by said hydraulic oil flow drawn through the motor/pump set cooling said motor reducing noise, vibration, and size of said system.

* * * * *